United States Patent [19]

Rundt et al.

[11] Patent Number: 5,120,962

[45] Date of Patent: * Jun. 9, 1992

[54] APPARATUS AND A METHOD FOR MEASURING THE ACTIVITY OF RADIOACTIVE SAMPLES CONTAINING A MULTIPLE OF RADIOACTIVE ISOTOPES, WITHOUT SEPARATE DETERMINATION OF THE QUENCH LEVEL

[75] Inventors: Kenneth Rundt, Turku; Heikki Kouru, Raiso, both of Finland

[73] Assignee: Wallac Oy, Turku, Finland

[*] Notice: The portion of the term of this patent subsequent to Apr. 17, 2007 has been disclaimed.

[21] Appl. No.: 651,217

[22] PCT Filed: Aug. 10, 1989

[86] PCT No.: PCT/FI89/00147

§ 371 Date: Feb. 6, 1991

§ 102(e) Date: Feb. 6, 1991

[87] PCT Pub. No.: WO90/01710

PCT Pub. Date: Feb. 22, 1990

[30] Foreign Application Priority Data

Aug. 10, 1988 [SE] Sweden .................. 8802861

[51] Int. Cl.$^5$ ............................................ G01T 1/204
[52] U.S. Cl. ...................... 250/362; 250/328; 250/364
[58] Field of Search ................ 250/362, 364, 328

[56] References Cited

U.S. PATENT DOCUMENTS

| | | | |
|---|---|---|---|
| 3,560,744 | 2/1971 | Jordan | 250/252.1 |
| 3,610,928 | 10/1971 | Thomas | 250/362 |
| 3,715,584 | 2/1973 | Rosenstingl | 250/362 |
| 4,005,292 | 1/1977 | Oesterlin et al. | 250/364 |
| 4,029,401 | 6/1977 | Nather | 250/328 |
| 4,085,325 | 4/1978 | Atallah et al. | 250/328 |
| 4,427,887 | 1/1984 | Berthold | 250/328 |
| 4,914,300 | 4/1990 | Kalish | 250/369 |
| 4,918,310 | 4/1990 | Rundt et al. | 250/328 |

FOREIGN PATENT DOCUMENTS 203901A 12/1986 European Pat. Off. .
9001710 2/1990 PCT Int'l Appl. .................. 250/364

OTHER PUBLICATIONS

"Beta Spectrum Analysis: A New Method to Analyze Mixtures of Beta-Emitting Radionuclides by Liquid Scintillation Techniques", W. L. Oller and P. Plato, *International Journal of Applied Radiation and Isotopes*, (1972) vol. 23, pp. 481–485.

*Primary Examiner*—Constantine Hannaher
*Attorney, Agent, or Firm*—Armstrong & Kubovcik

[57] ABSTRACT

Liquid scintillation counter includes a memory having stored spectra of known counting efficiencies and known levels of quench, for isotopes to be measured. A device extracts from the spectra, by using the determined quench level value for each of the N isotopes, a reference spectrum representing a pure isotope spectrum at the predicted quench level. A device determines for each extracted reference spectrum a factor by which the extracted reference spectrum is to be multiplied in order to fit the sum of the multiplied reference spectra to the sample spectrum. Each factor is directly related to the amount of each isotope in the sample. A device computes a goodness-of-fit value and predicts a new value for the quench level based on this goodness-of-fit value. A method in liquid scintillation counter includes predicting a first value of the quench level of the scintillation sample. A reference spectrum is extracted from stored spectra of known counting efficiencies and known levels of quench, for each of the N isotopes. The reference spectrum represents a pure isotope spectrum at the determined quench level. A factor is determined for each extracted reference spectrum by which the extracted reference spectrum is to be multiplied in order to fit the sum of the multiplied reference spectra to the sample spectrum. Each factor is directly related to the amount of each isotope in the sample. A goodness-of-fit value is computed and a new value for the quench level is predicted based on this goodness-of-fit value.

2 Claims, 2 Drawing Sheets

APPARATUS AND A METHOD FOR MEASURING THE ACTIVITY OF RADIOACTIVE SAMPLES CONTAINING A MULTIPLE OF RADIOACTIVE ISOTOPES, WITHOUT SEPARATE DETERMINATION OF THE QUENCH LEVEL

TECHNICAL FIELD

The invention relates to an apparatus and a method for determining the amounts of each radioactive isotope in a liquid scintillation sample containing a multiple of radioactive isotopes, without making use of an external standard for determining the quench level of the sample.

BACKGROUND OF THE INVENTION

Liquid scintillation counting is a method for determining the amount of one or more radioactive substances. The method is used predominently for determining beta-radioactive isotopes, such as $^3H$, $^{14}C$ and $^{32}P$.

Beta-radiactive isotopes decay by emitting energy in the form of a fast electron and a neutrino. The energy liberated in the decay is always constant for a certain radioisotope, but is divided between the electron and the neutrino according to a distribution law. The neutrino can not be detected by using liquid scintillation counting but the electron will through collisional impact, transfer some of its energy to the liquid solvent molecules which are then ionized or excited to higher energy levels. Provided that the solvent molecules are predominantly of aromatic character and that certain fluorizing compounds are dissolved in the solution, part of the excitation energy deposited by the electron may cause an emission of photons which can be detected by a photosensitive device such as a photomultiplier. The intensity of the light pulse caused by a decay is proportional to the energy of the electron when ejected from the nucleus. The height of the electrical pulse measured at the output of the photomultiplier is again proportional to the number of photons in the light pulse. As each decay produces one distinct pulse, with a height proportional to the energy of the beta electron, a certain pulse height distribution or spectrum, can be recorded. The shape of this pulse distribution depends not only on the decay characteristics but also on the efficiency of the liquid to transform excitation energy into light and the efficiency of the detector to transform photons into detectable electrical pulses.

FIG. 1 on the accompanying drawing shows typical pulse height distributions for $^3H$ and $^{14}C$, measured in a liquid scintillation counter having two photomultipliers working in coincidence and a multi-channel analyzer. The number of pulses in the pulse height distribution detected per time unit is called the count rate.

Quenching of the scintillation light pulse means that the number of photons produced in a decay, where the electron has a certain energy, is diminished. Hence, quenching results generally in both lower pulse heights and lower count rates. As the object in most measurements is to determine the activity, i.e. the disintegration rate, and not only the count rate, the relation between activity and count rate must be known. This relation is equal to the counting efficiency of the sample. As the counting efficiency may vary from sample to sample even within one measurement batch, it becomes necessary to determine the counting efficiency for each sample.

The determination of the efficiency of an unknown sample relies on calibration of the instrument. This step includes the measurement of a number of calibration samples containing known amounts of the pure radioisotopes to be measured and having different levels of quench. For each radioisotope one such quench calibration set must include at least two calibration samples. Each quench set thus results in a quench calibration function, giving counting efficiency as a function of some quench index, e.g. end point of external standard spectrum. In the case of two calibration samples for each radioisotope, the quench function will be a straight line. The quench function provides means to interpolate between, and to some extent extrapolate from, the calibration sample points.

As one unknown sample may contain several radioisotopes, the counter must have means for distinguishing the contribution of each radioisotope and also for determining the activity of each radioisotope. One such multi-labeled sample may further have a quench level not equal to any of the calibration samples. Generally the spectra of each radioisotope overlaps one another more or less (as apparent from FIG. 1). This provides for a complicated situation especially in the case when the sample contains more than two isotopes.

W. L. Oller and P. Plato (International Journal of Applied Radiation and Isotopes, 1972, Vol. 23, 481–485), indicate a method combining least squares fit and spectral analysis for determining the activities of all radioisotopes in a multi-labelled liquid scintillation sample. In the method of Oller and Plato, a beta spectrum of each sample was recorded and analyzed by using "a least squares spectrum analysis computer program". Oller and Plato do not give any details on how their program works and what it is based on. Neither do they take quench into consideration, as all unknowns are supposed to be of the same quench level.

BROAD DESCRIPTION OF THE INVENTION

The present invention takes the method of spectral analysis to completion: it involves storing the complete spectrum of each radioisotope for a number of distinct quench levels in a calibration library and extracting reference spectra at any desired quench level by using the spectra in the library for interpolation or extrapolation.

The apparatus according to the invention for determining the amounts of each radioactive isotope in a liquid scintillation sample containing N radioactive isotopes comprises
- a detector for measuring the photon emission from the liquid scintillation sample containing N radioactive isotopes of unknown activity, wherein each isotope produces a characteristic analog spectrum in the detector,
- an analog-to-digital converter connected to the detector for converting the analog spectrum to digital pulses,
- a multi-channel analyzer connected to the analog-to-digital converter for producing a digital pulse height sample spectrum,
- device for predicting a value for the quench level of the scintillation sample,
- a memory having stored spectra of known counting efficiencies and known levels of quench, for the isotopes to be measured, device for extracting from said spectra by using the determined quench level value, for each of the N isotopes, a reference spectrum representing a pure isotope spectrum at the predicted quench level, device for determining for each extracted reference spectrum a factor by which the extracted reference spectrum is to be multiplied in order to fit the sum of the multiplied reference spectra to the sample spectrum, each the factor being directly related to the amount of each isotope in the sample.

device for computing a goodness-of-fit value and for predicting a new value for the quench level on the basis of this goodness-of-fit value.

The method according to the invention for determining the amounts of each radioactive isotope in a liquid scintillation sample containing N radioactive isotopes, comprises measuring the photon emission from the sample, wherein each isotope produces a characteristic analog spectrum, converting the analog spectrum to digital pulses, producing a digital pulse height spectrum from the digital pulses, predicting a first value of the quench level of the scintillation sample, extracting from stored spectra of known counting efficiencies and known levels of quench, for each of the N isotopes, a reference spectrum representing a pure isotope spectrum at the determined quench level, determining for each extracted reference spectrum a factor by which the extracted reference spectrum is to be multiplied in order to fit the sum of the multiplied reference spectra to the sample spectrum, each factor being directly related to the amount of each isotope in the sample, and computing a goodness-of-fit value and predicting a new value for the quench level on the basis of this goodness-of-fit value.

BRIEF DESCRIPTION OF THE FIGURES

The invention will be described more in detail below with reference to the accompanying FIGS. 1 and 2.

DETAILED DESCRIPTION OF THE INVENTION

Figure 1:
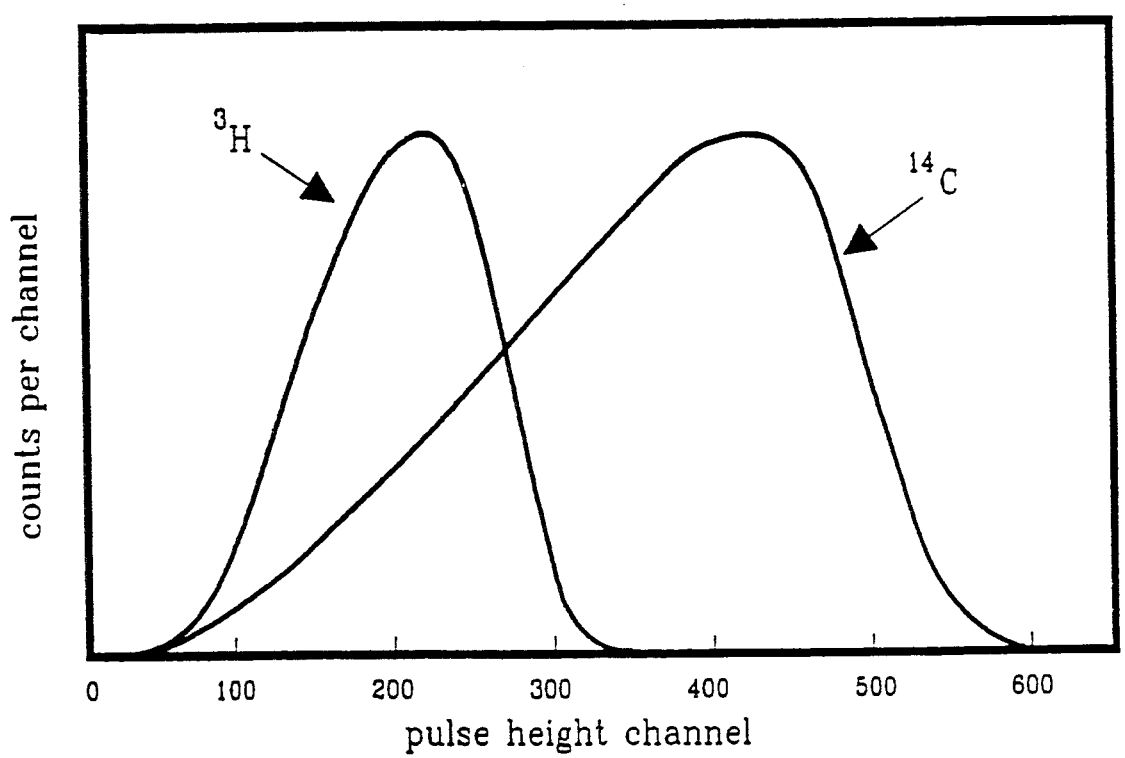
FIG. 1, as indicated above, shows typical pulse height distributions for $^3H$ and $^{14}C$.
Figure 2:
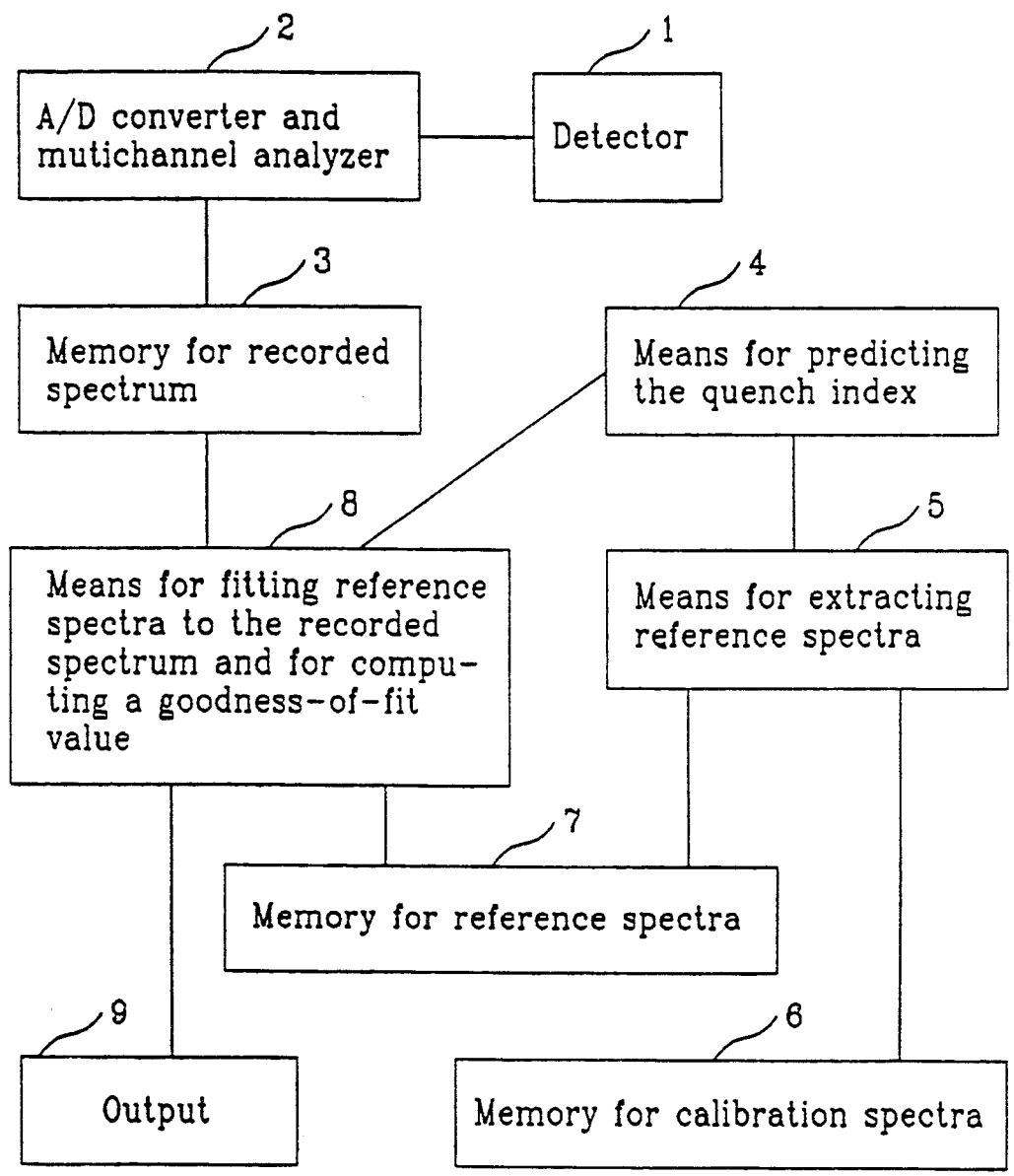
FIG. 2 shows a block diagram of one embodiment of a liquid scintillation counter according to the invention.

A liquid scintillation counter according to the invention is shown in FIG. 2. Referring to FIG. 2, the sample containing N radioisotopes to be measured, is placed in the detector unit 1, which may comprise two photomultipliers working according to the coincidence principle, with all necessary amplifiers and a coincidence analyzer, or simply a solid state detector with amplifier. The analog signal from the detector unit 1 is supplied to an analog-to-digital converter and a multichannel analyzer (MCA) 2. The spectrum collected by the MCA is temporarily stored in a memory unit 3. A value for a quench index reflecting the quench level of the sample is predicted by quench index predicting unit 4. The predicted quench index is then supplied to a unit 5 for extracting from a mass memory 6 one reference spectrum for each radioisotope, which are temporarily stored in a memory unit 7. The units 3 and 7 are connected to a computation unit 8, capable of comparing the spectra in these two units and producing for each reference spectrum, a factor by which each spectrum should be multiplied in order for the sum of the reference spectra to fit the measured spectrum in unit 3. The computation unit 8 also computes a goodness-of-fit value, proportional to the difference between the measured spectrum and the fitted reference sum spectrum, and determines on the basis of this value whether to instruct the quench index predicting unit 4 to produce a new quench value or not. The final multiplication factors, which are proportional to the amount of each radioisotope, are finally supplied to the output unit 9.

Prior to measuring samples having unknown activities, the counter must be calibrated. The calibration procedure embodied by this invention will be described in the following part.

For calibration, at least two calibration samples, at different quench levels, are needed for each radioisotope under consideration. This invention presupposes that for each isotope, all calibration standards are prepared at the same quench levels. Each calibration sample is measured and the spectrum may at this moment be normalized according to either of the two formulae $$r_i = c_i/C; \text{ for } i=1..T \tag{1a}$$

$$e_i = r_i/A; \text{ for } i=1..T \tag{1b}$$

where $r_i$ is the normalized count rate in channel i, $e_i$ is the counting efficiency of channel i and $c_i$ the measured count rate in channel i. T is the number of channels in the MCA. In eq. (1a) C is the sum of the count rates in all T channels and in eq. (1b) A is equal to the activity of the calibration sample. Hence, in the first case the spectrum is normalized to a constant value (=1) and in the second case normalized to the total counting efficiency E.

The calibration spectrum (normalized or not) is stored in the mass memory 6, either as such or smoothed by applying a digital filter or reduced to the form of an analytical function. If the MCA is divided into a larger number of channels then needed, the number of channels may be decreased by combining groups of neighbouring channels. The final number of channels must remain large enough, in order to keep the shape of the spectrum intact. The grouping procedure will also reduce the statistical fluctuations in the spectrum. The spectrum may also be stored as a shape function comprising M parameters, where M is smaller than or equal to T. In general terms, a shape function fitted to an unnormalized count rate spectrum can be expressed as $$c_i = F(i,a) \tag{2a}$$

wherein F denotes a function dependent on channel number i and a parameter vector a having M parameters to be stored. In this case one parameter vector a is stored for each spectrum. Fitting of a shape function with $M<T$ to the spectrum will always also smooth the spectrum and reduce the statistical fluctuations. One obvious analytical function is a polynomial of degree $M-1$, yielding M parameters.

Alternatively, a SPLINE function comprising of cubic polynomials, Gauss functions, Lorenzian functions or Fourier transforms may also be used.

Another obvious way of storing spectral data as a function of quench, is to store, for each channel, a function that describes the dependency between the channel count rate and the quench index. This so called channel function (e.g. a polynomial or a SPLINE function) can be computed only when all calibration samples have been measured. In general terms, a channel function fitted to the unnormalized count rates of channel i can be expressed as $$c_i = G(q, a_i) \quad (2b)$$

wherein G denotes a function dependent on quench index q and a parameter vector $a_i$ having M parameters to be stored. In this case, one parameter vector $a_i$ has to be stored for each channel. The shape function (2a) and the channel function (2b) may also be combined into one and the same function.

If the calibration spectra are not normalized at all or normalized to a constant value before storing, the total counting efficiency of the calibration sample should be stored together with the spectrum or the analytical function.

The procedure for counting of unknown samples, embodied by the present invention, will be described in the next part. The unknown sample is here supposed to contain at least one radioisotope, the number is assumed to be equal to N. The spectrum of the sample is measured and stored in a memory unit used only for temporary storage. The spectrum may be stored as such or smoothed by grouping channels or by applying a digital filter. Anyway, it should be stressed that in the present invention, the complete spectrum of the unknown sample is used for spectrum fitting and not the parameters of an analytical function fitted to the spectrum.

The following step, when counting unknowns, is to extract from the calibration spectra in the mass memory, a reference spectrum for each of the N radioisotopes. Depending on how the spectra are stored, this step may involve finding at least two calibration spectra or their shape functions (2a), the quench index of which, are nearest to the predicted sample quench index, and performing either interpolation between or extrapolation from these calibration spectra. Interpolation or extrapolation may be done by at first forming, for each channel of the calibration spectra, a channel function of the same type as function (2b), and then inserting the value for the sample quench index. The process of interpolation or extrapolation is repeated for all T channels, resulting in a new reference spectrum. If the calibration spectra were stored as unnormalized count rates, the extracted reference spectrum must hereafter be normalized either to 1 or to the counting efficiency.

If the calibration spectra were stored unnormalized or normalized according to eq. (1a), then a value for the counting efficiency, $E_j$, belonging to the reference spectrum j, must also be extracted from the efficiencies stored in the library.

Let the unknown sample spectrum count rate in channel i be denoted by $c_i$. If there are two radioisotopes present, Q and P, one may write $$c_i = C_Q \cdot r_{iQ} + C_P \cdot r_{iP}, \text{ for } i=1..T \quad (3a)$$

or $$c_i = A_Q \cdot e_{iQ} + A_P \cdot e_{iP}, \text{ for } i=1..T \quad (3b)$$

In eq. (3a), spectra normalized to 1 are used. The factors $r_{iQ}$ and $r_{iP}$ denote the normalized count rate of isotopes Q and P respectively in channel i. In eq. (3b), spectra normalized to the counting efficiency are used. The factors $e_{iQ}$ and $e_{iP}$ denote the counting efficiency of isotopes Q and P respectively in channel i. The multiplication factors to be determined are in eq. (3a) the unknown count rates, $C_Q$ and $C_P$, and in eq. (3b) the unknown activities, $A_Q$ and $A_P$, of isotopes Q and P respectively. Equations (3a) and (3b) are valid for all T channels in the spectrum, and each will thus comprise a set of T linear equations, where T is greater than the number of unknowns (in this example 2). Each set of equations can be solved by standard mathematical procedures, like minimizing the sum of squared differences between calculated $c_i$ and measured $c_i$. The first set of equations, (3a), will yield the count rates while the second set, (3b), will yield the activities. The present invention does not involve details on how the equation sets (3a) or (3b) are solved as this is a standard problem in mathematics. Among the alternatives are normal unweighted or weighted least squares fit, or any optimization technique, like SIMPLEX.

If eq. (3a) has been used, the activity of radioisotope j can be separately calculated by using the relation $A_j = C_j/E_j$.

As the counter can not accurately determine a quench level of the sample, an initial prediction must be made and a trail fit computed. From the goodness-of-fit, which can be a measure proportional to the sum of the squared differences that the fitting procedure tries to minimize, or another equal measure well known in statistics, the computer determines if to continue or not. By using an iterative minimizing technique, trying out a few different quench index values, the computer can make a quite accurate guess of the correct quench index of the sample and, hence, determine the correct reference spectra, and the involved activities.

The main steps of the spectral fit method are the following:

a) For each radioisotope involved, measure a set of calibration samples containing a known amount of the radioisotope in pure form and having different levels of quench. Note: The quench levels must be the same for all isotopes. For each calibration sample in the set, record the pulse height spectrum and store it, either as such or smoothed or as an analytical function, in a mass memory, together with the determined counting efficiency of the calibration sample.

b) For an unknown sample, containing at least two radio-isotopes known per se, record the pulse height spectrum and a value for the quench index and predict a first quench index value.

c) For each radioisotope present in the unknown sample, use the predicted value for the sample quench index to extract from the calibration spectra in the calibration memory a reference spectrum having the characteristics of the pure radioisotope.

d) Fit all reference spectra to the unknown spectrum by solving T equations of the types (3a) or (3b), e.g. by using the method of least squares or an optimization technique like SIMPLEX, in such a way that the count rate or activity of each radioisotope in the sample spectrum is determined.

If the set of equations (3a) was used:

e) For each radioisotope present in the unknown sample, use the sample quench index to extract from the efficiencies of the calibration spectra in the calibration memory, a value for the efficiency of the reference spectrum, and compute the activity of the radioisotope by dividing the count rate by the efficiency.

f) Compute a goodness-of-fit value that reflects how well the sum of the reference spectra are fitted to the unknown spectrum.

g) Select a new predicted value for the sample quench index and perform steps c), d), e) and f) until the goodness-of-fit value reaches a predetermined values.

The advantages of the spectral fit method are the following:

a) The calibrations are of general characters and may be used in any connection, single-label or multi-label. Hence, the data in the calibration memory may be considered as a general calibration library.

b) Counting is not optimized for any special condition, such as a certain quench level interval or a certain relative amount of the radioisotopes of interest.

c) The method is similar in a general multi-label case as in the special case of dual-label.

d) The reference spectra may also be used in quality control manner to ensure that the unknown sample do indeed contain the assumed radioisotopes, and may even be used to determine, in a qualitative manner, what radioisotopes are present in completely unknown samples.

We claim:

1. An apparatus for determining the amounts of each radioactive isotope in a liquid scintillation sample containing N radioactive isotopes, comprising:

a detector for measuring the photon emission from said liquid scintillation sample containing N radioactive isotopes of unknown activity, wherein each isotope produces a characteristic analog spectrum in said detector, an analog-to-digital converter connected to said detector for converting said analog spectrum to digital pulses, a multi-channel analyzer connected to said analog-to-digital converter for producing a digital pulse height sample spectrum, a) a memory having stored spectra of known counting efficiencies and known levels of quench, for the isotopes to be measured, b) means for predicting a first value for the quench level of said scintillation sample, c) means for extracting from said spectra by using said predicted quench level value, for each of said N isotopes, a reference spectrum representing a pure isotope spectrum at said predicted quench level, d) means for determining for each extracted reference spectrum a factor by which said extracted reference spectrum is to be multiplied in order to fit the sum of the multiplied reference spectra to said sample spectrum, each said factor being directly related to the amount of each isotope in the sample, e) means for calculating the difference between said sum and said sample spectrum, and f) means for minimizing said difference by predicting a new quench level value of said sample and applying means c), d) and e) until said difference reaches a predetermined value.

2. A method for determining the amounts of each radioactive isotope in a liquid scintillation sample containing N radioactive isotopes, comprising the step of:

measuring the photon emission from said sample, wherein each isotope produces a characteristic analog spectrum converting said analog spectrum to digital pulses, producing a digital pulse height spectrum from said digital pulses, a) predicting a value for the quench level of said scintillation sample, b) extracting from stored spectra of known counting efficiencies and known levels of quench, for each of said N isotopes, a reference spectrum representing a pure isotope spectrum at the predicted quench level, c) determining for each extracted reference spectrum a factor by which said extracted reference spectrum is to be multiplied in order to fit the sum of the multiplied reference spectra to the sample spectrum, each factor being directly related to the amount of each isotope in the sample, d) calculating the difference between said sum and said sample spectrum, and e) minimizing said difference by predicting a new value for the quench level of said sample and performing steps b), c) and d) until said difference reaches a predetermined value.

* * * * *

UNITED STATES PATENT AND TRADEMARK OFFICE
CERTIFICATE OF CORRECTION

PATENT NO. : 5,120,962

DATED : June 9, 1992

INVENTOR(S) : RUNDT et al

It is certified that error appears in the above-identified patent and that said Letters Patent is hereby corrected as shown below:

On the title page, Item [75], line 2, "Raiso" should read --Raisio--.

Signed and Sealed this

Twentieth Day of July, 1993

Attest:

MICHAEL K. KIRK

Attesting Officer

Acting Commissioner of Patents and Trademarks